(12) United States Patent
Baldwin

(10) Patent No.: US 10,860,466 B1
(45) Date of Patent: Dec. 8, 2020

(54) SYSTEMS, METHODS AND MEDIA FOR TESTING COMPUTER-EXECUTABLE CODE INVOLVING SENSITIVE-INFORMATION DOMAINS

(71) Applicant: Capital One Services, LLC, McLean, VA (US)

(72) Inventor: Andrew Baldwin, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/823,251

(22) Filed: Mar. 18, 2020

(51) Int. Cl.
G06F 11/36 (2006.01)
G06F 21/62 (2013.01)

(52) U.S. Cl.
CPC ...... *G06F 11/3688* (2013.01); *G06F 11/3664* (2013.01); *G06F 11/3684* (2013.01); *G06F 11/3692* (2013.01); *G06F 21/6245* (2013.01)

(58) Field of Classification Search
CPC . G06F 11/3688; G06F 11/3664; G06F 11/263
See application file for complete search history.

(56) References Cited

U.S. PATENT DOCUMENTS

| | | |
|---|---|---|
| 9,251,541 B2 | 2/2016 | Celka et al. |
| 10,339,038 B1 * | 7/2019 | Singh ................. G06F 11/3688 |
| 2010/0192220 A1 * | 7/2010 | Heizmann ........... G06F 21/6254 |
| | | 726/19 |
| 2013/0212638 A1 * | 8/2013 | Wilson ................ G06Q 50/26 |
| | | 726/1 |
| 2016/0232546 A1 | 8/2016 | Ranft et al. |
| 2018/0210817 A1 * | 7/2018 | Kelly ................. G06F 16/2455 |
| 2020/0012933 A1 * | 1/2020 | Truong ............... G06F 16/2237 |

FOREIGN PATENT DOCUMENTS

| | | |
|---|---|---|
| WO | 2017187207 A1 | 11/2017 |
| WO | 2018194707 A1 | 10/2018 |
| WO | 2019122854 A1 | 6/2019 |

* cited by examiner

*Primary Examiner* — Yolanda L Wilson
(74) *Attorney, Agent, or Firm* — Sterne, Kessler, Goldstein & Fox P.L.L.C.

(57) ABSTRACT

Computer-implemented methods, computer-readable media and apparatuses for testing executable code in sensitive-information domains are provided. A synthetic data set is received, where the synthetic data set includes generated subjects and corresponding information associated with the generated subjects. An active data set is received, where the active data set includes active subjects and corresponding information associated with the active subjects. The corresponding information associated with the active subjects includes sensitive information requiring privacy protection. The synthetic data set and the active data set are compared using an algorithm to identify the generated subjects that produce decisioning outcomes similar to decisioning outcomes of the active data set. A testing data set is generated by selecting the generated subjects identified using the algorithm and corresponding information associated with the identified generated subjects. The testing data set is output to a code-testing environment. Computer-executable code in the code-testing environment is tested using the testing data set.

20 Claims, 6 Drawing Sheets

SYSTEMS, METHODS AND MEDIA FOR TESTING COMPUTER-EXECUTABLE CODE INVOLVING SENSITIVE-INFORMATION DOMAINS

BACKGROUND

As people continue to transact more of their lives online, an ever-increasing quantity of personally identifiable information (PII) is being entrusted to the vendors and institutions through which these transactions are being made. Examples of PII include: full names, social security numbers, tax identification numbers (i.e., tax IDs), passport numbers, driver's license numbers, bank account details, email addresses, mailing information, health information, educational data, and many others. In other words, PII is the information criminals actively seek in order to make fraudulent charges, to complete fraudulent transactions, or to leverage in an otherwise illegal way. Fortunately, there are many stringent laws and regulations in place to protect the privacy of PII to help safeguard against leaks and disclosures of this information.

When evaluating an application for a new line of credit, such as mortgages, automobile loans, credit cards, home equity lines of credit, or the like, financial institutions are tasked with executing fast, accurate, and reliable methods for making decisions related to the creditworthiness of an applicant. The terms and conditions associated with the line of credit for which the applicant is applying must also be determined quickly. All of this must take place, while also maintaining compliance with the rules and regulations intended to protect the privacy of the applicant. Similar circumstances exist when dealing with information for tax analysis and filing, predictive tools for health-care patients and diagnosis, educational information regarding students at various levels, as well as in other innovative software products that should simultaneously produce quick processing while adequately safeguarding the aforementioned sensitive information.

One particular challenge for institutions dealing with PII comes from the ability to test software improvements and updates under realistic conditions. Software developers at an institution may take an active data set and apply steps to anonymize its PII in order to introduce that active data set into a testing environment. This comes with a substantial drawback, as the measures to anonymize the data may not always be successful. Such errors thus expose the PII during testing and violate certain regulatory protections for the data. In addition to these risks, even successful scrubbing of data to anonymize users' PII comes out great expense and/or effort.

Alternatively, a synthetic data set may be obtained by the institution from a third party. The synthetic data set may include PII of individuals mixed and matched with other data in order to produce a fictitious data set for testing purposes. At least one drawback of this type of data set is the inability for the purchaser/institution to know whether or not the synthetic data set will produce realistic decisioning results as compared to an active data set. The mixing and matching of data may lead to computationally erroneous outcomes, such as extending credit to an applicant that would not receive that offer in the real world, or implausible results (e.g., an inappropriate loan term that does not fit the transaction, such as a $2000 transaction fee for a $1000 loan). These errors could be introduced immediately with the synthetic data, or alternatively could only be evident in later computations and decisions (i.e., downstream decisions). With the synthetic data, the errors can show up immediately, but might also only be evident after some period of time when underlying conditions or assumptions have changed that materially affect the decisioning outcomes. For all of these reasons, synthetic data has drawbacks.

Solutions are needed to minimize or overcome the above-mentioned tradeoffs concerning non-production software development environments and various data sets containing personally identifiable information. In other words, solutions are needed for generating data sets that provide realistic testing results without increasing the risk of inadvertent disclosure of PII.

DETAILED DESCRIPTION

Figure 1:
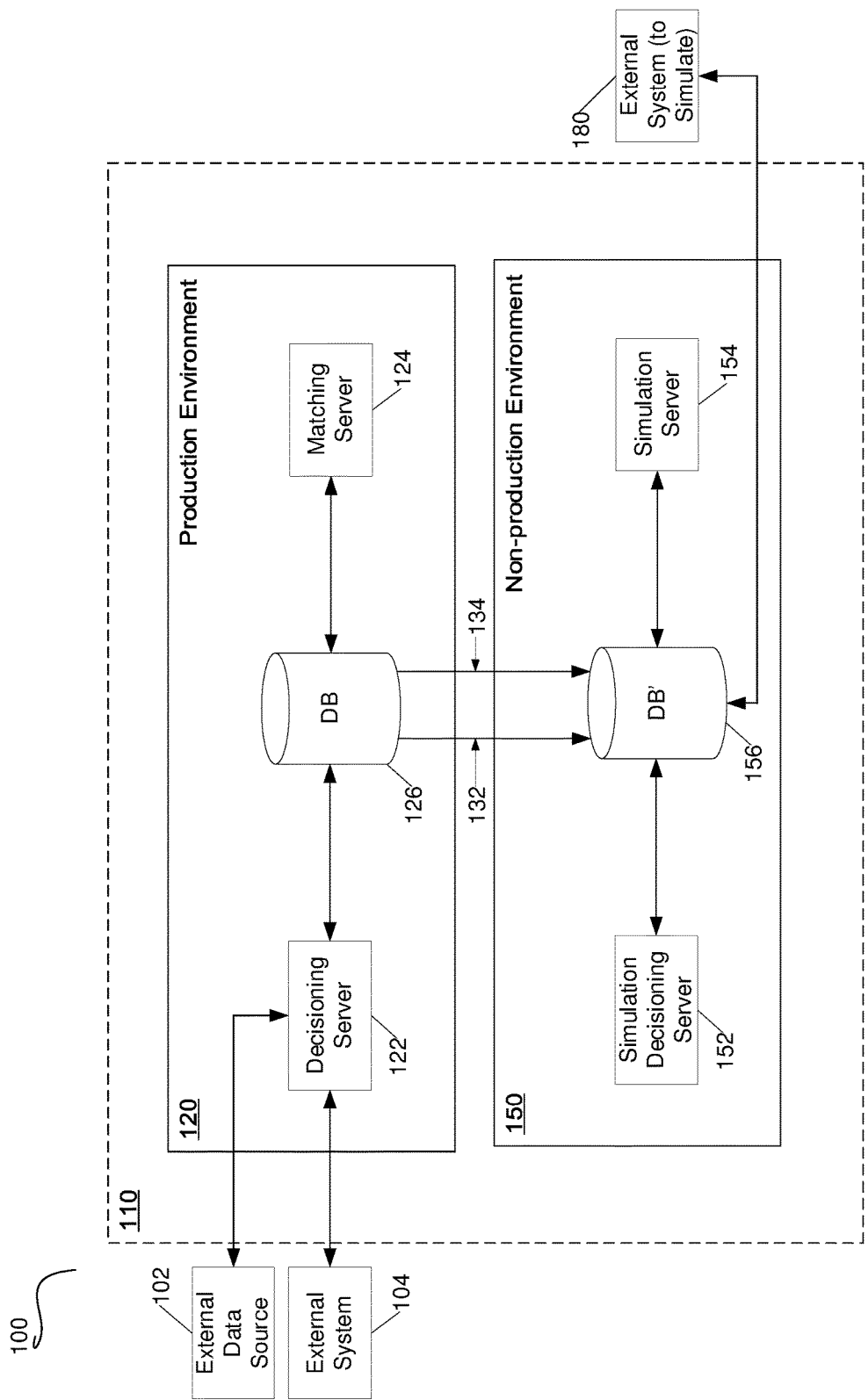
FIG. 1 depicts a system for testing computer-executable code according to an embodiment of the application.

Below are methods, media and systems for blending the anonymity of synthetic data sets while maintaining the realistic outcomes of anonymized active data sets. In the below description, reference to an embodiment refers to at least one embodiment, but such features and elements may be included in more than a single embodiment. Certain features and elements will be understood as interchangeable, thus various combinations and sub-combinations are possible within the described examples. In the drawings, like reference numbers generally indicate identical or similar elements. Additionally, generally, the left-most digit(s) of a reference number identifies the drawing in which the reference number first appears.

The following description involves computer-implemented methods, media, and systems for testing executable code in sensitive-information domains. Domains that pertain to sensitive information include without limitation such areas as financial and banking institutions, health-care providers, educational institutions, and tax preparation professionals, amongst others. Information regarding individuals may be subject to protections in the United States and abroad. Merely as examples in the U.S., personal information is subject to certain conditions based on the Dodd-Frank Wall Street Reform and Consumer Protection Act (financial/banking information), the Health Insurance Portability and Accountability Act (i.e., "HIPAA" for health-care patients) and the Family Educational Rights and Privacy Act (i.e., "FERPA" for students), among numerous other safeguards for privacy. Other federal and state statutes exist in the U.S., while other jurisdictions around the world provide similar privacy protections. While rooted in legal protections through legislative, executive, and judicial government actions, these measures create technical challenges and difficulties that must be addressed with technical solutions as outlined above and below.

In embodiments, a synthetic data set and an active data set are received. The active data set can include active subjects and corresponding information associated with the active subjects used by one or more enterprise applications. At least some of the corresponding information associated with the active subjects is sensitive information protected by one or more privacy laws or regulations, such as those mentioned above. These data sets are the institution's stores of customer, patient, or student data that are used by various software platforms and applications/programs across the institution's computing infrastructure. At least a portion of that active data is used by decisioning servers of the institution to produce a decision related to the institution's or subject's transactions with one another.

The active data set can also include unprotected data associated with the subjects (non-PII or non-identifying information), such as financial information, health information, or educational data. As an example in the financial services area, the non-PII included in the active data set can be offer terms, such as interest rates, loan durations, or the like. Other non-identifying information for other situations are also possible, such as generic educational data (academic classification for university students as an example), or generic health-related data (whether patients are classified as "active" or "inactive" by a medical practice based on time since a previous visit). In other words, non-identifying information can include portions of the data set that do not provide clues to the subject's/user's identity due to the lack of a one-to-one relationship between the data and the person to whom the data is related.

The synthetic data set can include generated subjects and corresponding information associated with the generated subjects. The synthetic data set can be received from a vendor, such as a credit reporting agency. Examples of vendors for synthetic data sets include EQUIFAX® or EXPERIAN® amongst credit rating bureaus, or Bloomberg Professional Services, Moody's Analytics, or MORNINGSTAR® among financial analytics businesses. While synthetic data sets such as these are common, reliance on an outside vendor or agency is not necessary and any source of a synthetic data set is contemplated within the scope of this application.

The synthetic data set can be generated by actually generating fictitious people and data. However, synthetic data can also be created by taking real people and data and "scrambling" the associated information to form a new data set. For example, a first person's first name, a second person's last name, a third person's opening portion of a social security number, a fourth person's middle portion of a social security number, a fifth person's ending portion of a social security number, a sixth person's age, a seventh person's city of residence, and an eighth person's annual income can be combined to create the record for a fictional person. In this way, realistic data can be generated for synthetic data sets, even though the data itself originates from actual data (i.e., from real users). However, other methods are available to generate synthetic user data and data sets as will be understandable to those skilled in the relevant areas of data science and analysis.

In embodiments, the synthetic data set and the active data set are compared using algorithms to identify the generated subjects that produce decisioning outcomes similar to decisioning outcomes of the active data set. A number of algorithms can be used to identify the appropriate subjects and outcomes. However, due to the desired outcome of producing similar decisioning outcomes from the synthetic data set as compared to the active data set, clustering algorithms can be used to identify the most accurate and reliable data set. Several types of clustering algorithms are available and suitable, such as density-based clustering algorithms, centroid-based clustering algorithms, or distribution-based clustering algorithms. This list is not exhaustive, but merely illustrates what types of algorithms can be used. In fact, other types can be used, including proprietary algorithms developed for the specific purposes noted in this application.

In one or more embodiments, a testing data set can be generated by selecting the generated subjects identified by the algorithm. The corresponding information associated with the identified generated subjects will also be included in the testing data set. Given that any number of clustering algorithms can be used for selection of the subjects for the testing data set, a corresponding variety of criteria can be used for the identification and selection process. As an example, subjects within a certain "distance" of the actual data set can be used to insure the most relevant and accurate results. Alternatively, a certain minimum number in the distribution can be used. A combination of the two factors could be relied upon to identify and select the testing data set, insuring a certain minimum number but all subjects within a certain distance. Other criteria can be used and the above examples are not intended to limit the algorithm and selection process.

The testing data set can be outputted to a code-testing (i.e., non-production) environment. The non-production environment will be suitable for testing changes to various applications normally used in the production environment. The non-production environment can simulate the entire production environment for the enterprise, mimicking all of the applications in use, or may only reproduce a portion of the production environment and its associated applications. The non-production environment can be used for testing applications operating exclusively within the production environment, or can also be used for simulating applications that rely on external systems to function.

The computer-executable code can then be tested in the code-testing environment using the testing data set. For instance, the changes can be updates made to the code used to execute one or more applications. As an example, those changes can be configuration changes, which can affect one or more outcomes by a decisioning server. During testing, simulations can be run to determine the outcome of those code/configuration changes, i.e., whether the application performs as expected.

As one example, a simulation can then be monitored for effects to decisioning outcomes to detect if undesirable results occur responsive to the change(s) in configuration. As mentioned above, these undesirable results can include non-sensical terms that should be avoided in actual operation of the application, such as an exorbitant fee on a small loan. However, the undesirable results could also include full-fledged computing errors that prevent decisioning from being carried out, unwanted delays in decisioning, or the like. Other known examples of testing outcomes are contemplated and these examples are not intended to be limiting in nature.

Turning now to the accompanying Drawings, FIG. 1 illustrates a simplified diagram of a system 100 for testing computer-executable code according to an embodiment of the disclosure. System 100 includes an enterprise environment 110 having a production environment 120 and a non-production environment 150. An external data source 102 and an external system 104 are shown in communication with components of production environment 120, while an external system 180 is depicted in communication with components of non-production environment 150.

Production environment 120 depicted in FIG. 1 includes a decisioning server 122, a matching server 124, and an active database 126. For example, the production environment 120 can be an active computing system, used for the delivery of active services and/or applications in a networked computing environment for an enterprise operating in a highly regulated domain, such as for financial services and banking. Other examples of production environment 120 including computing infrastructure for a health services practice, an educational institution, or a tax preparation entity (individual or company). Production environment 120 can include various other conventional network computing components that have been omitted for simplicity of illustration.

Active database 126 as shown in FIG. 1 can store records of customers, past customers and/or potential customers in a financial services context (i.e., banking/financing/credit customers). Other records of individuals are also contemplated within the scope of the application as would be customary with the above-noted types of production environments. However, in each case mentioned, active database 126 can store records of people whose information must be safeguarded more rigorously than ordinary user information, and thus may not involve customer data at all. Other examples of records stored in active database 126 can include information for healthcare patients, students, tax filers, or others who conduct transactions of a legally protected, private nature.

The decisioning server 122 shown in FIG. 1 is configured to receive information from the external data source 102, from external system 104, and from active database 126. Decisioning server 122 can perform automatic decisioning to produce a decisioning result based on the data provided about the subjects in active database 126. For example, decisioning server 122 can produce a credit decision, such as a mortgage or an automobile loan, based on a number of financial and demographic factors associated with the subjects in question. Following the example, factors such as income, age, credit rating, and location can all be factors that help decisioning server 122 to automatically render the credit decision.

Further to this example, decisioning server 122 can determine a variable set of terms for the credit decision, such as interest rates, repayment duration, required down payment, processing fees and/or other terms associated with the approved credit transaction. As can be seen from these terms, decisioning server 122 can process more than a yes/no answer on a credit application. While given in the financial context above, other decisioning outputs would be possible, as will be understood by one skilled in the relevant arts.

Decisioning server 122 executes classification of data through various methods, which can include automatic decisioning using machine learned algorithms and routines. While decisioning server 122 can employ training sets of data in order to provide a baseline for the automatic decisioning or classification of data, training sets are not required for decisioning server 122. Decisioning server 122 can produce any number of outputs based on any number of inputs, and thus is not limited by a strictly binary input/output system like a simple credit decision of authorization or declination.

As an example, decisioning server 122 can automatically determine a loan amount, a loan duration, an interest rate, and any additional applicable fees based on an applicant's age, income, income history, credit history, and/or any other pertinent details. Other examples of automatic decisioning are considered equivalent and contemplated within the scope of this application, such as health diagnoses, health-related recommendations, medication and/or prescription recommendations, available financial services, products, or offers, tax preparation instructions and recommendations, academic recommendations, financial aid suggestions, or the like.

As shown in FIG. 1, matching server 124 is in communication with active database 126 in order to execute an algorithm for generating a test data set. While described in further detail below, at a high level, the algorithm for generating a test data set involves identifying the most similar data from a synthetic data set that matches certain decisioning outcomes for the active data set. The test data set generated by matching server 124 through the use of one or more of the clustering algorithms can then be used to test applications in order to simulate one or more applications in a non-production environment, such as non-production environment 150.

Non-production environment 150 includes a simulation decisioning server 152, a simulation server 154, and a test database 156. Simulation decisioning server 152 can be similar in operation to decisioning server 122, with a primary difference being the server's location in the non-production environment 150 (e.g., non-production environment 150 is an application/code-testing environment). Likewise, simulation server 154 can be any service from the production environment 120 that developers need to test in non-production environment 150.

It will be apparent to one of skill in the relevant arts that the non-production environment 150 is not limited to only a single simulation server or a single simulation decisioning server, but can include as many simulation servers as necessary given the components of production environment 120. If needed, multiple simulation servers can be used in non-production environment 150 in order to observe effects that are brought about in one server after changes to another server. Multiple simulation servers may also be used when the output of one server is necessary as the input for another server, or vice versa.

The non-production environment's simulation servers can be wholly tested within the environment or in communication with external sources for operation. Thus, the number of simulation servers and services, as well as the number of additional components that interact with those simulated components, can be varied within the scope of the present application. The variability and complexity of the simulated, non-production environment will be largely dependent on the makeup of the production environment as would be understood by one skilled in the relevant arts.

Further, test database 156 shown in FIG. 1 includes the data for testing code of the simulation server(s) of non-production environment 150. As depicted in FIG. 1, test database has two streams of data communicated from database 126, which are labeled data stream 132 and data stream 134. Data stream 132 is non-PII that can be sent because no extra care is needed, thus allowing for accurate data that yields the same results as in the production environment 120. Data stream 134 includes the test data set, including the "synthetic PII" or "safe PII", the PII that is selected from vender data set(s) so as to protect the rights of active users on active database 126.

What does not flow from database 126 to test database 156 is PII that could expose sensitive information of users, customers, patients, or students. By eliminating the flow of actual PII from active database 126 to test database 156, the testing system 100 eliminates the potential for "masked" PII to be exposed, while simultaneously maintaining test data sets that will yield realistic code-testing results. Thus, the best features of both approaches to testing in sensitive-information domains are realized through the use of system 100.

Figure 2:
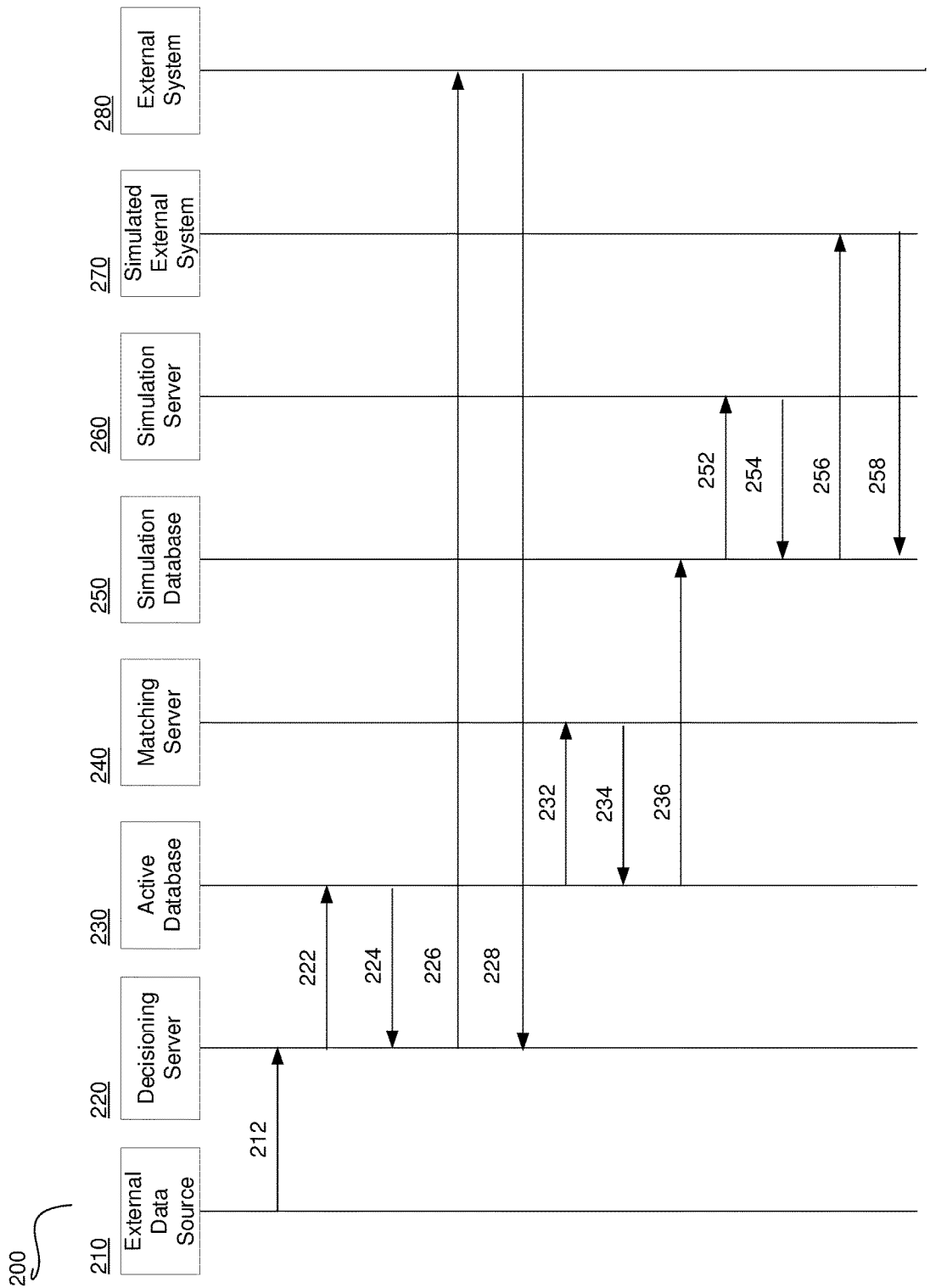
FIG. 2 is a flow diagram for testing computer-executable code according to an embodiment of the application.

FIG. 2 illustrates a data flow diagram 200 using a system for testing computer-executable code according to an embodiment of the application. The servers and devices from which the information is sent and at which the information is received are similar to the servers and devices as shown and described in FIG. 1 above. Data flow diagram 200 includes an external data source 210, a decisioning server 220, an active database 230, a matching server 240, a simulation database 250, a simulation server 260, a simulated external system 270, and an external system 280. Due to the similarities with the components of FIG. 1, further description of these components will be omitted here for both clarity and brevity.

External data source 210 transmits a synthetic data set to decisioning server 220 as shown by initial transmission 212 in FIG. 2. As an example, the synthetic data set contained in initial transmission 212 can be a set of user data for purchase from a credit-rating agency (e.g., EXPERIAN® or EQUIFAX®). As noted above, a number of other potential synthetic data sets are possible and contemplated within the scope of this application, depending on the needs for the tester of the computer-executable code. Decisioning server 220 transmits application request(s) to an active database at application request transmission(s) 222 as a matter of the regular course of application execution and management. These requests are understood as the routine requests for the operation of the decisioning server. Using the examples from above, these requests can be used for the decisioning of a credit inquiry, such as a loan application for a mortgage or vehicle. Other examples include other credit transactions of a secured or unsecured nature, but are not so limited. These routine decisions can be related to healthcare, educational or tax applications.

Decisioning server 220 receives an application response transmission (or transmissions) 224 back from active database 230 in order to carry out decisioning server 220's regular routines and operations. One of skill in the art would recognize that request(s) 222 and response(s) 224 can be singular in nature, or can be iterative as desired. Optionally, decisioning server 220 can also send and receive external request(s) 226 and external response(s) 228, respectively, to external system 280 in order to execute operations as needed. Again, all of these communications are (or optionally may be) part of the normal operation of one or more servers in the production environment in order to provide applications and features of an everyday production environment, such as production environment 120 shown in FIG. 1.

As part of the process of generating an appropriate test data set, active database 230 sends a matching request transmission 232 to matching server 240, which includes the PII used for the routine application request(s) 222. In response, matching server 240 returns a matching result transmission 234 to active database 230. The matching result transmission includes the testing data set algorithmically identified by matching server 240, for later use by the simulation server(s) in the non-production environment. Matching server 240 can use one of a variety of algorithms in order to perform this operation and thus producing the test data set of matching result transmission 234.

With this architecture, the identification and selection of an appropriate test data set by matching server 240 occurs within the production environment. By performing these operations in a production (or other PII safe) environment, the need to transmit PII to the non-production environment is eliminated. This elimination avoids any potential inadvertent disclosure of the PII, as well as increases the efficacy of the data set in the testing environment based on increased realism.

Continuing with the code-testing preparation process, active database 230 transmits a simulation enabling transmission 236 to simulation database 250. The simulation enabling transmission 236 includes both the non-sensitive information and test data set, similar or identical to data streams 132 and 134 mentioned above. While more can be included as part of simulation enabling transmission 236, at least the data streams necessary for testing the computer-executable code in the non-production environment are sent at this stage.

Responsive to receiving simulation enabling transmission 236 in the non-production environment, simulation database 250 and simulation server 260 exchange communications in the form of simulation request(s) 252 and request(s) 254. If appropriate, and depending on the application or process being simulated, simulation database 250 can optionally communicate external simulation request and results transmission(s) 256 and 258, respectively, to simulated external system 270.

Simulation server 260 can be similar to or identical with simulation decisioning server 152 as shown and described in FIG. 1. Alternatively, simulation server 260 can be similar to or identical with simulation server 154 of FIG. 1. So long as at least some information needed for the simulation is PII, the specifics of the simulation and code-testing operations do not affect the technical solution achieved through the use of a testing data set sent with simulation enabling transmission 236.

As noted above, because simulation enabling transmission 236 sends the test data set constructed from matched synthetic data, active PII from the production environment is never sent to the non-production environment. Accordingly, the related simulation communications between external system 270 and simulating database 250 and/or simulation server 260 do not involve sensitive PII. As such, compliance with privacy requirements is simplified from a technical viewpoint.

Figure 3:
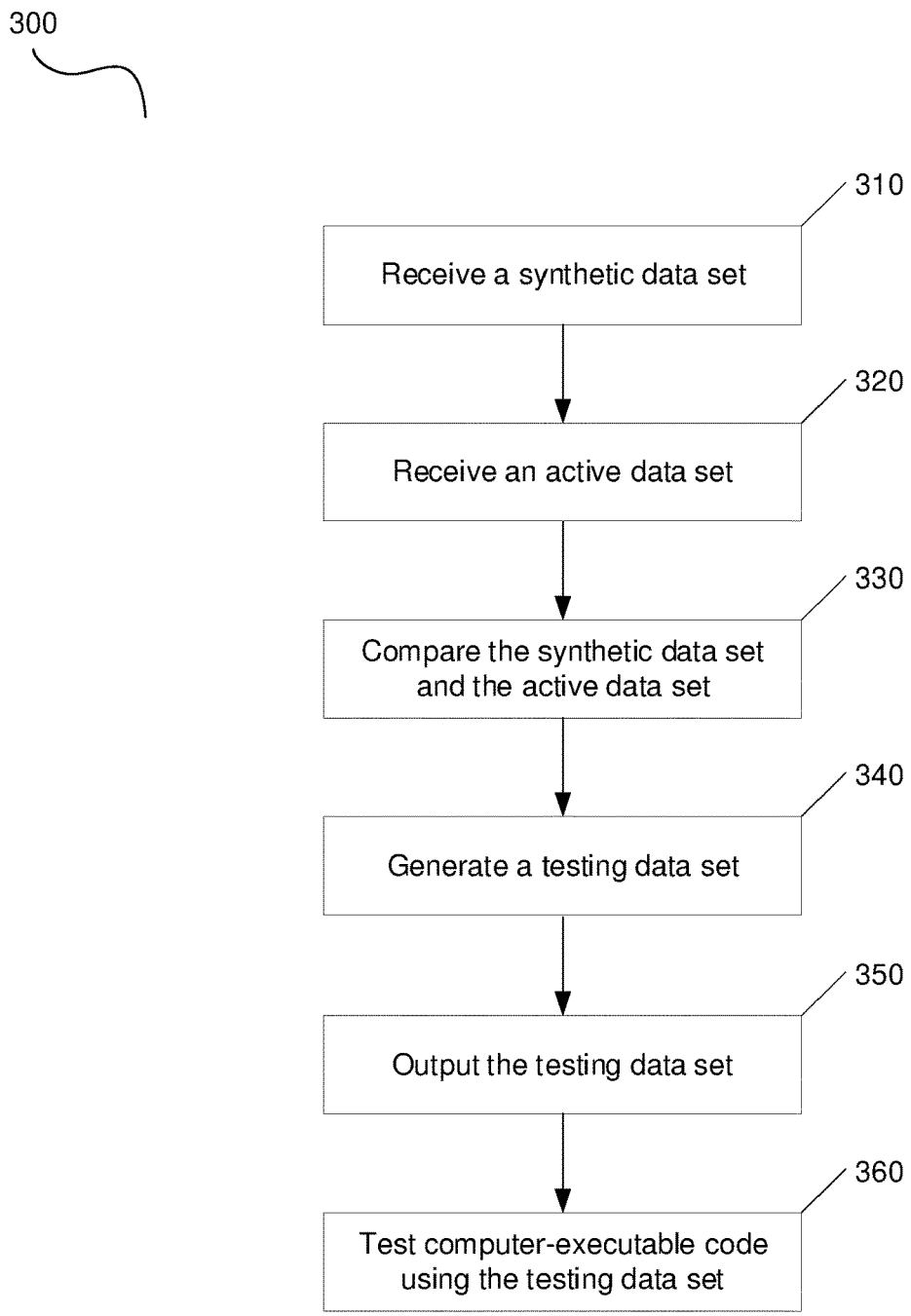
FIG. 3 is a flowchart representing a method of testing computer-executable code according to an embodiment of the application.

FIG. 3 depicts a computer-implemented method 300 for testing executable code in sensitive information domains, in accordance with an embodiment of the present disclosure. A synthetic data set is received, by a matching server, as shown at a step 310. As described above and below, the synthetic data set can include generated subjects and corresponding information associated with the generated subjects. In some embodiments, the synthetic data set may be received from a data vendor and/or third party (e.g., a credit bureau or other reporting agency). The matching server can be similar or identical to matching server 124 as depicted in FIG. 1.

An active data set is received by the matching server at a step 320. The active data set can include active subjects and corresponding information associated with the active subjects, the corresponding information associated with the active subjects being sensitive information requiring privacy protection. In some embodiments, the privacy protection regulations may prevent transmitting the active data set.

Alternatively, the privacy protection regulations may place onerous burdens in the masking or otherwise protecting the active data set through technical means.

In embodiments, the active data set and the active subjects and corresponding information associated therewith can be a portion of the personally identifiable information (PII) (e.g., social security number, date of birth, address, bank account numbers, etc.) requested of an applicant, patient, student or user. As a further example, the PII can be requested while completing an application for a new line of credit (e.g., a mortgage, an auto-loan, or a new credit card) with a financial institution.

Responsive to receipt of the synthetic data set at step 310 and receipt of the active data set at step 320, the matching server uses an algorithm to compare the data sets at a step 330 to identify the generated subjects that produce decisioning outcomes similar to decisioning outcomes of the active data set. In some embodiments, the decisioning outcomes may be related to and/or indicative of the creditworthiness of an applicant applying for a new line of credit with a financial institute. Additionally and/or alternatively, the terms associated with the new line of credit (e.g., interest rate, revolving credit limit, trade-in value, etc.) may be related to/dependent upon the decisioning outcomes.

Algorithms which may be used to compare the synthetic data set and the active data set at step 330 can include (and/or can be based on/derivative of): a nearest neighbor, K-nearest neighbor, mean square, spatial clustering, centroid-based clustering, distribution-based clustering, density-based clustering, a mean shift algorithm, expectation maximization using Gaussian mixtures, or any other algorithm, be it well known or proprietary, suitable for comparing data sets. A testing data set is generated by the matching server at a step 340 by selecting the generated subjects and corresponding information associated with the generated subjects identified using the algorithm.

A matching server, active database, or other communications component can then output the testing data set at a step 350 to a code-testing environment. The comparing 330, the generating 340, and the outputting 350 can be executed in a production environment. Examples of such a production environment can include distributed client-server environments providing applications and features for user. Other examples involve the use of web-based applications and services for interaction with customers, users, patents, or students.

In embodiments, computer-executable code is then tested using the testing data 360 in a non-production environment. Thus, the testing data set provided from the matching server and production environment produces realistic testing conditions in the non-production environment. This realism results without exposing sensitive information (i.e., PII) to processing or protection, or without spending unnecessary time and expense on generating synthetic data.

Figure 4:
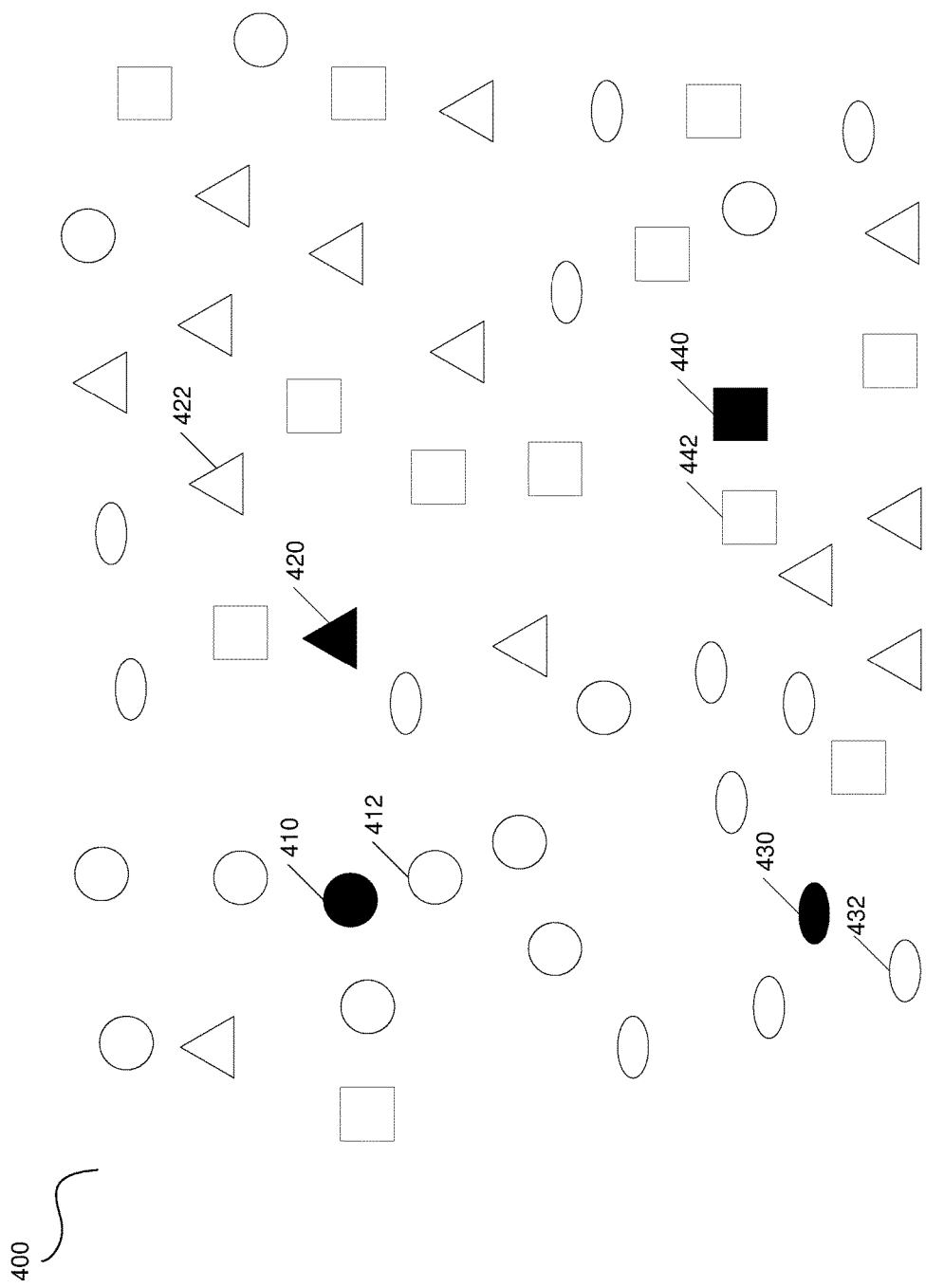
FIG. 4 is a representation of an algorithm for generating a testing data set according to an embodiment of the application.
Figure 5:
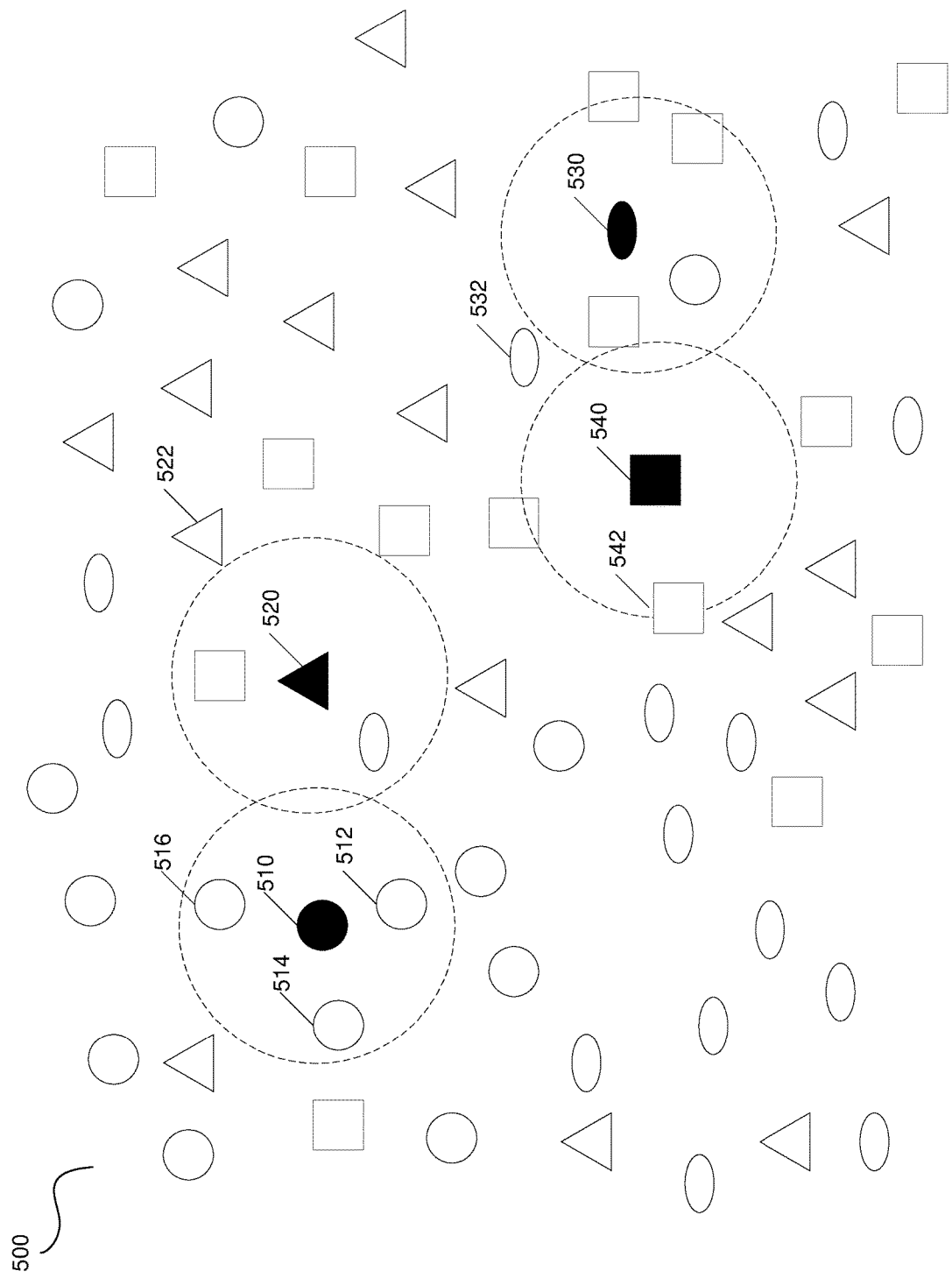
FIG. 5 is a representation of another algorithm for generating a testing data set according to an embodiment of the application.

FIGS. 4 and 5 depict visual representations of clustering algorithms for generating a test data set according to embodiments of the present application. FIG. 4 includes a data set 400, which represents a commingled data set including individual pieces of data from both an active data set and a synthetic data set. In data set 400, shapes with a solid fill (denoted as data points 410, 420, 430 and 440) represent pieces of data from the active data set. Those shapes with only an outline represent pieces of data from the synthetic data set. A portion of those data points are numbered as data points 412, 422, 432, and 442.

The shapes vary according to the type of data. For example, the circles can represent an age, the squares an income, the triangles a social security or tax ID number, and the ovals a zip code. Each piece of data can be related to the others of a set or subset by some vector distance based on the similarity or dissimilarity of the data. Thus, the closely located data points are most similar and those located more distantly are dissimilar.

For example, a data point representing an age of "18" would be closest to a data point representing "19", while much older ages representing "60" and "62" would be close to each other, but distant from "18" and "19". Various methods of representing the similarity or dissimilarity of the data as a vector quantity can be used to determine these relationships and will not be detailed in this application. However, each data type in the overall data sets can be mapped for its respective relation to other data points of the corresponding type of data.

Returning to FIG. 4, data point 412 is most closely aligned with data point 410, thus designating data 412 as a best fit data point for a testing data set. Likewise, data points 420, 430 and 440 also have respective closest data points 422, 432, and 442. Therefore, if data points 410, 420, 430 and 440 made up a single applicant record in one of the preceding examples, data points 412, 422, 432, and 442 could be combined to construct an applicant record for use in the testing data set.

While a single record is used for the above example, it will be understood that data set 400 could include any number of active data points from any number of active records for a user, patient, student or applicant. In such cases, a data point from the synthetic data set could be the closest fit for a number of active data points. In other embodiments, in order to construct distinct records for a test data set, only the closest data point that has not previously been selected can be used for a test data set. Various selection methods are available depending on the specific type of clustering or classification algorithm selected, and the scope of the present application contemplates that a number of matching profiles are possible depending on the selection algorithm.

In FIG. 5, a combined data set 500 also represents a commingled data set including individual pieces of data from both an active data set and a synthetic data set, with identical representation by filled and outlined shapes for type of data. As depicted in FIG. 5, the data points of the active data set (shown as data points 510, 520, 530, and 540) are surrounded by a larger dotted circle, the dotted circle representing a distance (i.e., vector radius) within which all similar data points will be used to construct a test data set. The distance for the depicted circles has been randomly selected and larger or smaller circles are possible in other embodiments.

Data point 510 has three data points (numbered 512, 514, and 516) from the synthetic data set which are within the vector radius for selection as data points for a test data set. As such, the algorithm used in FIG. 5 can have additional records because more data points are within a range of realistic values when compared to data point 510. Data point 540 has a single match at least partially within the depicted radius, shown as data point 542. Data points 520 and 530 do not have a match within the specified radius, and thus a nearest point is selected (i.e., data points 522 and 532, respectively).

Departing from the figures, what now follows is an example use case involving one or more aspects of the above embodiments. This example use case outlines a determination of the effect(s) of changes in a policy engine. According to this example use case, a credit decisioning algorithm can determine an annual percentage rate (APR) used for an auto loan, referred to as Offer A, that is specific to a particular user (i.e., a real person having a name, social security number and a credit rating) and a particular vehicle (i.e., associated with a vehicle ID number or VIN), referred to as User B and Vehicle C. The determination is further related to a particular deal structure, having a loan term, trade-in amount, and other associated computations, which are all a part of Offer A. Thus, the active data set includes both the sensitive information associated with the real person (User B) as well as the details of the deal structure and specific vehicle (Offer A and Vehicle C, respectively).

According to embodiments of this application, a synthetic data set is received from a credit-rating bureau. Using a nearest neighbor algorithm, a synthetic data set can be examined for data that is most closely related to User B in order to generate User B'. Synthetic data most similar to other protected aspects of this active data set, including each of Offer A, User B, and Vehicle C, can also be generated. Following the outlined solutions of this application, the effects of changes to the decisioning algorithm for the exact deal structures of Offer A associated with User B and Vehicle C from the production environment can be replicated in the code-test environment using the most similar synthetic data received, now represented as User B'.

Thus, executing credit decisioning in a manner consistent with the technical method described above keeps financial institutions in compliance with privacy regulations that create technical, rather than regulatory, issues. The simulated credit decision is based solely on outcomes generated from synthetic data in the code-testing environment, but blends the technical advantages of both anonymized actual data and purely synthetic data.

Figure 6:
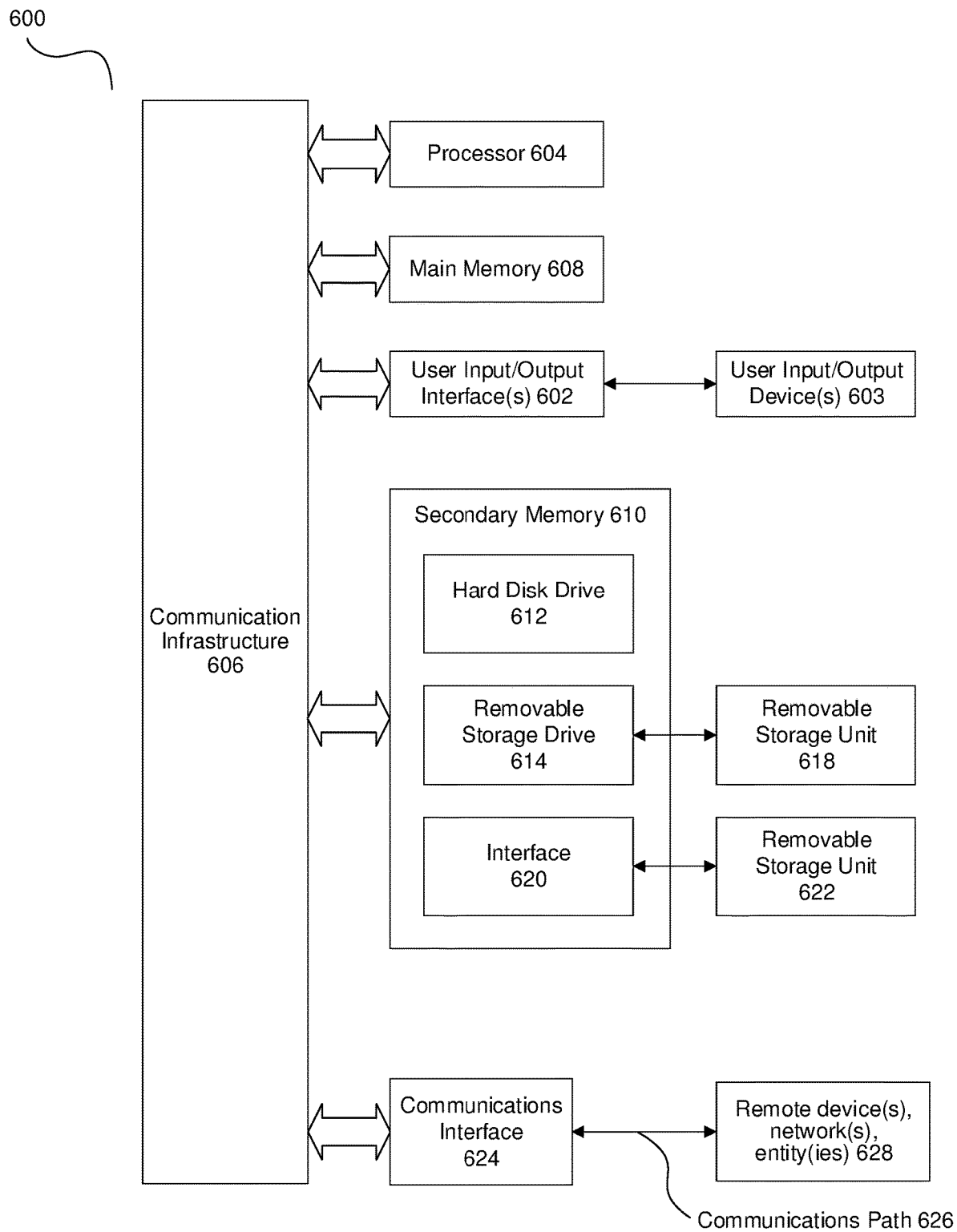
FIG. 6 depicts an example computer system useful for implementing various embodiments.

FIG. 6 depicts an example computer system useful for implementing various embodiments. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data. Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

The invention claimed is:

1. A computer-implemented method for testing executable code in sensitive-information domains, the method comprising:
    receiving a synthetic data set, the synthetic data set comprising generated subjects and corresponding information associated with the generated subjects;
    receiving an active data set, the active data set comprising active subjects and corresponding information associated with the active subjects, wherein the corresponding information associated with the active subjects includes sensitive information requiring privacy protection;
    comparing the synthetic data set and the active data set using an algorithm to identify the generated subjects that produce decisioning outcomes similar to decisioning outcomes of the active data set;
    generating a testing data set by selecting the generated subjects identified using the algorithm and corresponding information associated with the identified generated subjects;
    outputting the testing data set to a code-testing environment; and
    testing computer-executable code in the code-testing environment using the testing data set.

2. The computer-implemented method of claim 1, wherein the comparing, the generating, and the outputting is executed in a production environment.

3. The computer-implemented method of claim 2, wherein the receiving an active data set comprises receiving a data set associated with an application in the production environment, and wherein the testing computer-executable code comprises testing computer-executable code associated with a variant of the application in the production environment.

4. The computer-implemented method of claim 3, wherein the testing computer-executable code occurs based on real-time changes to the active data set.

5. The computer-implemented method of claim 1, wherein the comparing the synthetic data set and the active data set uses a clustering algorithm.

6. The computer-implemented method of claim 5, wherein the clustering algorithm is a centroid-based clustering algorithm, a distribution-based clustering algorithm, or a density-based clustering algorithm.

7. The computer-implemented method of claim 5, wherein the clustering algorithm is a K-nearest neighbor algorithm.

8. The computer-implemented method of claim 5, wherein the clustering algorithm is a Gaussian mixture model using an expectation-maximization algorithm.

9. The computer-implemented method of claim 5, wherein the clustering algorithm is a mean-shift algorithm.

10. The computer-implemented method of claim 1, wherein the receiving an active data set comprises receiving a data set having financial, tax, education, or health information protected by one or more privacy protection regulations, wherein the privacy protection regulations prevent transmitting the active data set to the code-testing environment.

11. A non-transitory computer readable medium having a set of computer-executable instructions embodied thereon for performing a method of testing executable code in sensitive-information domains, the method comprising:
    receiving a synthetic data set, the synthetic data set comprising generated subjects and corresponding information associated with the generated subjects;
    receiving an active data set, the active data set comprising active subjects and corresponding information associated with the active subjects, wherein the corresponding information associated with the active subjects includes sensitive information requiring privacy protection;
    comparing the synthetic data set and the active data set using an algorithm to identify the generated subjects that produce decisioning outcomes similar to decisioning outcomes of the active data set;

generating a testing data set by selecting the generated subjects identified using the algorithm and corresponding information associated with the identified generated subjects;

outputting the testing data set to a code-testing environment; and testing computer-executable code using the testing data set.

12. The non-transitory computer readable medium of claim 11, wherein the comparing, the generating, and the outputting is executed in a production environment, wherein the receiving an active data set comprises receiving a data set associated with an application in a production environment, and wherein the testing computer-executable code comprises testing computer-executable code associated with a variant of the application.

13. The non-transitory computer readable medium of claim 12, wherein the algorithm for identifying the generated subjects is a nearest-neighbor algorithm performing steps of, selecting one or more parameters for a nearest-neighbor determination, wherein the one or more parameters comprise a distance, a number of subjects, and/or a weighted criterion;

determining one or more nearest-neighbor results based the selected one or more parameters; and generating the testing data set from among the nearest-neighbor results based on a threshold.

14. The non-transitory computer readable medium of claim 11, wherein the comparing the synthetic data set and the active data set for identifying data similarity uses a clustering algorithm, wherein the clustering algorithm is a centroid-based clustering algorithm, a distribution-based clustering algorithm, or a density-based clustering algorithm.

15. The non-transitory computer readable medium of claim 14, wherein the clustering algorithm is a K-nearest neighbor algorithm, a mean-shift algorithm, or a Gaussian mixture model using an expectation-maximization algorithm.

16. A system for testing executable code in sensitive-information domains, the system comprising:

an active database in a production environment, the active database storing an active dataset that includes sensitive information requiring privacy protection, wherein the active database is configured to communicate with an external data source, a decisioning server, a matching server, and a simulation database;

the matching server, wherein the matching server is in the production environment, and wherein the matching server is configured to:

receive at least a portion of the sensitive information requiring privacy protection from the active database, compare the at least a portion of sensitive information with a synthetic data set, generate a test data set based on the comparing of the at least a portion of sensitive information with the synthetic data set, and send the test data set to the active database; and the simulation database in a non-production environment, configured to receive the test data set from the active database for testing computer-executable code in the non-production environment.

17. The system of claim 16 further comprising:

the decisioning server in the production environment, wherein the decisioning server is configured to automatically generate decisions based on the active dataset, wherein the automatically generated decisions are associated with an application in the production environment; and a simulation server in the non-production environment, wherein the simulation server is configured to test computer-executable code associated with a variant of the application in the production environment.

18. The system of claim 17, wherein the system is configured to test the computer-executable code based on real-time changes to the active data set.

19. The system of claim 16, wherein the matching server is configured to generate the test data set based on a clustering algorithm.

20. The system of claim 19, wherein the clustering algorithm is a centroid-based clustering algorithm, a distribution-based clustering algorithm, or a density-based clustering algorithm.

* * * * *